(12) United States Patent
Jenkins

(10) Patent No.: US 9,215,946 B2
(45) Date of Patent: Dec. 22, 2015

(54) METHOD AND APPARATUS FOR MAKING BEER AND OTHER ALCOHOLIC BEVERAGES

(76) Inventor: Sean Jenkins, Montross, VA (US)

(*) Notice: Subject to any disclaimer, the term of this patent is extended or adjusted under 35 U.S.C. 154(b) by 100 days.

(21) Appl. No.: 13/613,460

(22) Filed: Sep. 13, 2012

(65) Prior Publication Data

US 2014/0072678 A1    Mar. 13, 2014

(51) Int. Cl.
*B65D 81/32* (2006.01)
*A47J 31/06* (2006.01)
*A47J 31/00* (2006.01)
*B65D 25/08* (2006.01)
*C12G 1/00* (2006.01)
*C12G 3/04* (2006.01)
*B65D 85/804* (2006.01)

(52) U.S. Cl.
CPC .............. *A47J 31/00* (2013.01); *B65D 25/08* (2013.01); *B65D 85/804* (2013.01); *C12G 1/00* (2013.01); *C12G 3/04* (2013.01)

(58) Field of Classification Search
CPC ........... A47J 31/00; B65D 25/08; C12G 1/00; C12G 3/04
USPC .......... 426/79, 431, 77, 84, 115, 238; 99/295, 99/323.2, 290, 275, 300
See application file for complete search history.

(56) References Cited

U.S. PATENT DOCUMENTS

| | | | | |
|---|---|---|---|---|
| 2,148,051 A | * | 2/1939 | Talladas | 426/15 |
| 2,758,030 A | * | 8/1956 | Metz | 426/436 |
| 3,048,489 A | * | 8/1962 | Peter | C12C 7/00 426/29 |
| 3,113,029 A | * | 12/1963 | Hernandez | C12C 1/18 426/16 |
| 5,325,765 A | * | 7/1994 | Sylvan et al. | 99/295 |
| 5,470,601 A | | 11/1995 | Robertson | |
| 5,695,795 A | * | 12/1997 | Murray | C12H 1/18 426/11 |
| 5,869,117 A | * | 2/1999 | Neufeld et al. | 426/62 |
| 6,139,724 A | * | 10/2000 | Strohm et al. | 210/85 |
| 7,032,507 B2 | | 4/2006 | Cai | |
| 7,963,213 B1 | * | 6/2011 | Murdock | 99/323.1 |
| 8,087,347 B2 | | 1/2012 | Halliday et al. | |
| 8,152,017 B2 | * | 4/2012 | Lizerbram et al. | 220/254.9 |
| 2003/0039731 A1 | | 2/2003 | Dalton et al. | |
| 2009/0004343 A1 | * | 1/2009 | Xiong et al. | 426/115 |
| 2010/0288131 A1 | * | 11/2010 | Kilber et al. | 99/295 |
| 2010/0303964 A1 | * | 12/2010 | Beaulieu et al. | 426/77 |
| 2011/0076361 A1 | | 3/2011 | Peterson et al. | |
| 2011/0142997 A1 | * | 6/2011 | Jonsson | 426/115 |
| 2011/0151075 A1 | | 6/2011 | Peterson | |
| 2011/0226343 A1 | * | 9/2011 | Novak et al. | 137/12.5 |
| 2011/0305801 A1 | | 12/2011 | Beer | |
| 2012/0056008 A1 | * | 3/2012 | Claessens | 239/33 |
| 2012/0058226 A1 | * | 3/2012 | Winkler et al. | 426/79 |

* cited by examiner

*Primary Examiner* — Dana Ross
*Assistant Examiner* — Ket D Dang
(74) *Attorney, Agent, or Firm* — Nixon & Vanderhye P.C.

(57) ABSTRACT

A beverage preparation machine with a receptacle for removably receiving therein a disposable cartridge having a first liquid ingredient and alcohol separated by a frangible partition. A movable lid closes the receptacle with the cartridge therein and has an inlet tube that pierces the upper portion of the cartridge when the lid is closed. An outlet tube at a lower portion of the receptacle pierces the lower portion of the cartridge when the lid is closed. A bottle is removably mounted on the machine beneath the outlet tube. A cold water reservoir is connected to the inlet tube. For carbonated beverages, a carbon dioxide source is connected to the machine at the upper end of the bottle.

4 Claims, 1 Drawing Sheet

METHOD AND APPARATUS FOR MAKING BEER AND OTHER ALCOHOLIC BEVERAGES

BACKGROUND OF THE INVENTION

1. Field of the Invention

The present invention relates to the preparation of beer or another alcoholic beverage and, more particularly, to the use of a cartridge positioned in a beverage preparation machine for the instant preparation of such a beverage.

2. Description of the Prior Art

Currently, the preparation of beer, wine and other alcoholic beverages is a relatively complicated process that requires a considerable amount of time and expense. With the popularity of coffee and similar drinks prepared instantly by inserting a cartridge in a beverage preparation machine, a need has arisen for the preparation of beer and other alcoholic beverages using a similar process for the preparation of such beverages in a short period of time with minimal effort and expense. The method and apparatus of the present invention meets this need.

SUMMARY OF THE INVENTION

For the preparation of beer, a disposable cartridge is provided that has malt extract and alcohol in separate compartments therein that are separated by a frangible partition such as a membrane or the like. The cartridge is positioned in a receptacle in a beverage preparation machine having a source of cold water, a source of carbon dioxide, and a beverage bottle or other container removably connected thereto.

A lid or arm of the machine is closed or moved to pierce the upper and lower surfaces of the cartridge with an inlet tube and an outlet tube, respectively. The inlet tube is connected to the water source. The flow of cold water into the cartridge breaks the partition so that a mixture of the malt extract and alcohol flows through the outlet tube into the bottle.

Thereafter, carbon dioxide is conveyed to the bottle to pressurize the mixture of malt extract and alcohol therein to produce the beer. The bottle is then removed from the machine for the consumption of the beer therein.

The same method and apparatus may be used to prepare other carbonated or non-carbonated alcoholic beverages. For the preparation of wine, for example, the cartridge could have grape juice and tannic acid in one compartment and the correct proportion of alcohol in the other compartment separated by a suitable frangible partition. The carbonization of the liquid mixture in the bottle would be optional depending on whether the wine is to be carbonated or non-carbonated.

DESCRIPTION OF THE PREFERRED EMBODIMENTS

Figure 1:
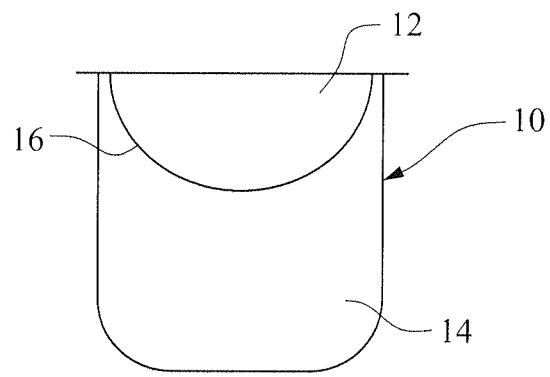
FIG. 1 is a front elevational view of a beverage cartridge for use in the beverage preparation machine of the present invention.

FIG. 1 illustrates a disposable cartridge 10 constructed to be mounted in a receptacle of a beverage preparation machine for the preparation of beer, wine or another alcoholic beverage. The cartridge 10 may be formed of any suitable material such as a plastic and, in the case of beer, contains malt extract in a first sealed compartment 12 and alcohol in a second sealed compartment 14 that are separated by a frangible partition 16 such as a membrane or the like formed of any suitable material such as plastic. The partition 16 is constructed to be broken when exposed to a flow of cold water as will be further explained hereinafter.

The size of the cartridge 10 and the amount of malt extract and alcohol therein are sufficient to produce a bottle or container of beer of a predetermined size when mixed with a predetermined amount of cold water and carbonated as will be further explained hereinafter.

Figure 2:
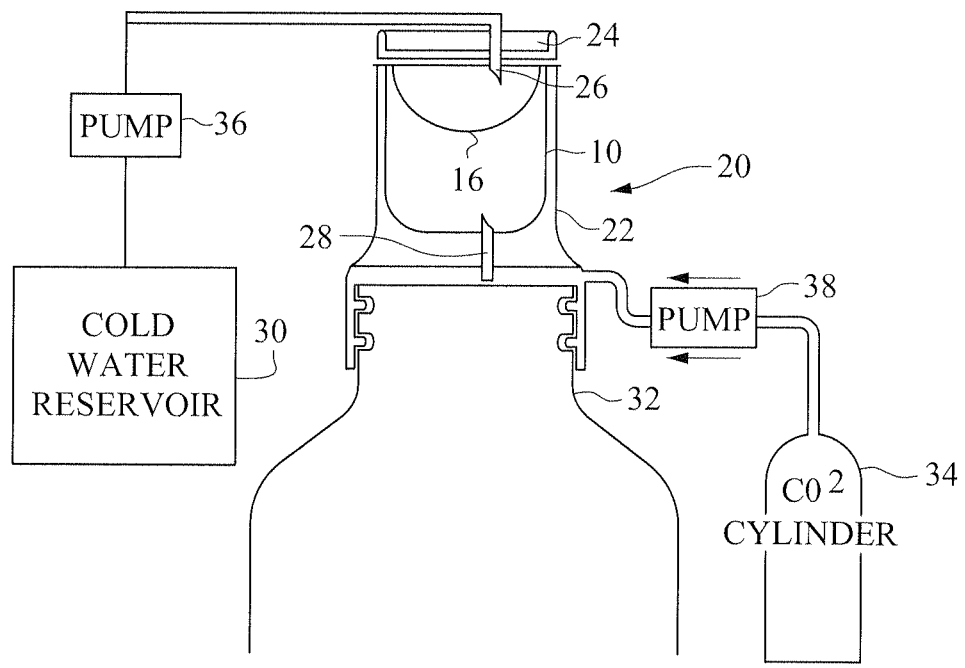
FIG. 2 is a schematic view of the beverage preparation machine of the present invention.

Referring to FIG. 2, the beverage preparation machine 20 comprises a receptacle 22 for the cartridge 10 and a movable lid 24 having an inlet tube 26 for piercing the upper portion of the cartridge 10 when the lid 24 is moved to the closed position shown in FIG. 2. The lower portion of the cartridge 10 is pierced by an outlet tube 28 in the receptacle 22 when the lid 24 is moved to the closed position. The inlet tube 26 is connected to a cold water reservoir 30 and the outlet tube 28 is positioned above a bottle 32 or other container removably mounted on the machine 20 in any suitable manner such as by a threaded connection. A carbon dioxide source 34 is connected to the machine 20 just above the upper end of the bottle 32.

In the operation of the beverage preparation machine 20, a bottle 32 is mounted on the machine, the cartridge 10 is positioned in the receptacle 22 and the lid 24 is closed to cause the inlet tube 26 to pierce the upper portion of the cartridge 10 and the outlet tube 28 to pierce the lower portion of the cartridge 10. Cold water is then conveyed from the reservoir 30 to the inlet tube 26 by a first pump 36. The cold water flowing into the cartridge 10 causes the partition 16 to break so that a mixture of the cold water, malt extract and the alcohol flows through the outlet tube 28 into the bottle 32 to fill it. Thereafter, the liquid mixture in the bottle 32 is carbonated by conveying carbon dioxide from the source 34 to the upper end of the bottle 32 by a second pump 38 for a predetermined period of time. Upon the completion of the carbon dioxide charging cycle, the bottle 32 is removed from the machine 20 to consume the beer formed therein.

It will be readily seen, therefore, that beer can be produced with the use of the cartridge 10 and machine 20 easily and in a very short period of time without the normal fermentation processes that are slow, time consuming and complicated.

Other alcoholic beverages may be prepared by the machine with the use of a disposable cartridge in which another liquid ingredient is substituted for the malt extract.

In the case of wine, for example, a mixture of grape juice and tannic acid could be substituted for the malt extract in the first compartment and the carbonization would be optional depending on whether the wine is to be carbonated or not. Any suitable liquid concentrate could be provided in the first compartment to prepare a desired alcoholic beverage that may be carbonated or not.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. Apparatus for the preparation of beer, comprising:
   a disposable cartridge having malt extract and alcohol separated by an impermeable frangible partition;
   a receptacle for removably receiving the disposable cartridge therein, a movable lid for closing the receptacle with the disposable cartridge therein, the lid comprising an inlet tube for piercing an upper portion of the disposable cartridge when the lid is closed, the receptacle having an outlet tube at a lower portion thereof for piercing an adjacent lower portion of the disposable cartridge when the lid is closed, a bottle removably mounted beneath the outlet tube, and a cold water reservoir connected to the inlet tube, whereby upon the closing of the lid, cold water is conveyed from the reservoir to the inlet tube and into the disposable cartridge to break the impermeable partition and cause a mixture of cold water, said malt extract and alcohol to flow through the outlet tube into the bottle, further comprising a carbon dioxide source connected to the upper end of the bottle for conveying carbon dioxide to the bottle to carbonate the mixture and form beer therein.

2. The machine of claim 1 wherein the bottle is removably mounted on the machine by a threaded connection.

3. The machine of claim 1 further comprising a first pump for conveying the cold water from the reservoir to the inlet tube.

4. The machine of claim 1 further comprising a second pump for conveying carbon dioxide from the source to the machine at the upper end of the bottle.

\* \* \* \* \*